(12) United States Patent
Hathaway et al.

(10) Patent No.: US 10,962,149 B2
(45) Date of Patent: Mar. 30, 2021

(54) FUEL HOSE WITH RUBBER COVER LAYER

(71) Applicant: EATON CORPORATION, Cleveland, OH (US)

(72) Inventors: Colleen Marie Hathaway, Dundee, MI (US); Gina Theresa Clark, Lambertville, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/768,490

(22) PCT Filed: Oct. 14, 2016

(86) PCT No.: PCT/US2016/057011
§ 371 (c)(1),
(2) Date: Apr. 13, 2018

(87) PCT Pub. No.: WO2017/066548
PCT Pub. Date: Apr. 20, 2017

(65) Prior Publication Data
US 2018/0313474 A1    Nov. 1, 2018

Related U.S. Application Data

(60) Provisional application No. 62/242,014, filed on Oct. 15, 2015.

(51) Int. Cl.
*B32B 1/08* (2006.01)
*F16L 11/08* (2006.01)
(Continued)

(52) U.S. Cl.
CPC .............. *F16L 11/085* (2013.01); *B32B 1/08* (2013.01); *B32B 3/10* (2013.01); *B32B 5/02* (2013.01);
(Continued)

(58) Field of Classification Search
CPC .......... C08L 23/16; C08L 23/286; B32B 1/08; B32B 2250/03; B32B 2250/04;
(Continued)

(56) References Cited

U.S. PATENT DOCUMENTS 3,891,725 A * 6/1975 Klever ................ C08L 2666/04
525/211
5,795,635 A    8/1998 Iwasaki
(Continued)

FOREIGN PATENT DOCUMENTS

JP    4450018 B2    4/2010
JP    5595233 B2    9/2014
(Continued)

OTHER PUBLICATIONS

Biofuels—The Next Great Source of Energy? Encyclopedia Britannica, Jan. 31, 2008 (Year: 2008).*
(Continued)

*Primary Examiner* — Lee E Sanderson
(74) *Attorney, Agent, or Firm* — Merchant & Gould P.C.

(57) ABSTRACT

A fuel hose is provided for use in diesel fuel, biodiesel fuel, gasoline, crude oil, lubricating oil and synthetic oil applications. The hose comprises an HNBR tube layer, a reinforcement layer and a rubber cover layer to improve ease and cost of manufacture.

19 Claims, 4 Drawing Sheets

(51) Int. Cl.

| | |
|---|---|
| *B32B 25/16* | (2006.01) |
| *B32B 25/10* | (2006.01) |
| *B32B 25/02* | (2006.01) |
| *B32B 3/10* | (2006.01) |
| *B32B 25/18* | (2006.01) |
| *B32B 5/02* | (2006.01) |
| *C08L 15/00* | (2006.01) |
| *B32B 25/04* | (2006.01) |
| *B32B 25/14* | (2006.01) |
| *F16L 11/04* | (2006.01) |

(52) U.S. Cl.
CPC ............ *B32B 25/02* (2013.01); *B32B 25/042* (2013.01); *B32B 25/10* (2013.01); *B32B 25/14* (2013.01); *B32B 25/16* (2013.01); *B32B 25/18* (2013.01); *C08L 15/005* (2013.01); *B32B 2250/03* (2013.01); *B32B 2250/04* (2013.01); *B32B 2250/05* (2013.01); *B32B 2250/40* (2013.01); *B32B 2250/42* (2013.01); *B32B 2262/0261* (2013.01); *B32B 2262/0269* (2013.01); *B32B 2262/0276* (2013.01); *B32B 2262/04* (2013.01); *B32B 2262/062* (2013.01); *B32B 2264/102* (2013.01); *B32B 2264/108* (2013.01); *B32B 2307/306* (2013.01); *B32B 2307/50* (2013.01); *B32B 2307/714* (2013.01); *B32B 2307/7265* (2013.01); *B32B 2597/00* (2013.01); *F16L 2011/047* (2013.01)

(58) Field of Classification Search
CPC ..... B32B 2250/05; F16L 11/04; F16L 11/042; F16L 11/05; F16L 11/08; F16L 11/081; F16L 11/082; F16L 11/083; F16L 11/088; F16L 11/12
USPC .................................. 428/36.9, 36.91, 36.92
See application file for complete search history.

(56) References Cited

U.S. PATENT DOCUMENTS

| | | | | |
|---|---|---|---|---|
| 6,093,775 | A * | 7/2000 | Pechhold | C08F 8/34 525/331.6 |
| 6,440,512 | B1 * | 8/2002 | Thomas | B32B 1/08 428/36.91 |
| 6,926,038 | B1 | 8/2005 | Cook et al. | |
| 2006/0100328 | A1 | 5/2006 | Goossens | |
| 2006/0260706 | A1 | 11/2006 | Colbachini | |
| 2010/0021665 | A1 * | 1/2010 | Jackson | B32B 1/08 428/36.91 |
| 2011/0226375 | A1 * | 9/2011 | Harris | B32B 1/08 138/137 |
| 2012/0041126 | A1 * | 2/2012 | Nasreddine | C08L 15/005 524/451 |

FOREIGN PATENT DOCUMENTS

| | | |
|---|---|---|
| KR | 20040090118 A | 10/2004 |
| WO | 95/01854 A1 | 1/1995 |

OTHER PUBLICATIONS

HNBR ZETPOL®, downloaded http://www.zeon.eu/hnbr-zetpol.html, 10 pages, downloaded Oct. 2016.
Status for "Zetpol," US Registration No. 1636152, registration date Feb. 26, 1991, owner Zeon Corporation, first use date Apr. 1, 1983, 59 pages total.
Product Guide, Zeon Chemicals L.P., 2017, 17 pages total.
Eaton Brand GH100 ESP™ Hose for Biodiesel and High Temperature Synthetic Oils, 2009, Eaton Corporation, 2 pages total.
Barricade® Fuel Injection Hose brochure, Gates Corporation, 2013, 4 pages total.
International Search Report and Written Opinion of the International Searching Authority for corresponding International Patent Application No. PCT/US2016/057011 dated Feb. 1, 2017, 11 pages.
"Endurance Energized by Lanxess, Energizing Chemistry", X Therban, 16 pages (2013).
"Standard Test Methods for Rubber-Viscosity, Stress Relaxation, and Pre-Vulcanization Characteristics (Mooney Viscometer)", ASTM International, Designation: D 1646-04, 12 pages (2004).
Hi-Sil™ 532EP Rubber Reinforcing Silica, PPG Industries, Inc., 3 pages (2011).
Chemical Compatability Chart for Rubber, Utex Industries, Inc., 2014, 22 pages total.
Database WPI, Derwent World Patents Index, vol. 2005, No. 17, Database accession No. 2005-159503, XP002791809, 1 page total.
Supplementary European Search Report for corresponding European Patent Application No. 168562627, dated Aug. 2, 2019, 13 pages total.

* cited by examiner

FUEL HOSE WITH RUBBER COVER LAYER

CROSS-REFERENCE TO RELATED APPLICATION

This application is a National Stage Application of PCT/US2016/057011, filed on Oct. 14, 2016, which claims the benefit of U.S. Patent Application Ser. No. 62/242,014, filed on Oct. 15, 2015, the disclosures of which are incorporated herein by reference in their entireties. To the extent appropriate, a claim of priority is made to each of the above disclosed applications.

BACKGROUND OF THE INVENTION

Hydrogenated nitrite rubber (HNBR) is a desirable compound commonly used for fuel hose and power steering applications. HNBR is a slower curing rubber compound than most other common rubber compounds with fuel compatibility.

A common manufacturing problem with hose comprising HNBR is the formation of pin holes in the inner tube. During the curing process, rubber flows through the open interstices of the braided reinforcement which can lead to strike through and the formation of tiny holes in the tube. These holes are detected during proof and/or mandrel ejection when the hose leaks during pressurization. Pin holes can occur on any hose but most commonly occur on hose built with very soft tube compounds such as hydrogenated nitrile rubber (HNBR). HNBR is very soft and may lead to an unacceptable amount of scrap in the plant due to pin holes. The typical solution has always been to thicken the tube and/or increase the coverage of the reinforcement; however both those solutions can cause other manufacturing issues as well as increased costs. A robust hose comprising HNBR for use in diesel fuel, biodiesel fuel, gasoline, crude oil, lubricating oil and synthetic oil applications is desirable.

SUMMARY OF THE INVENTION

A fuel hose comprising an inner HNBR tube layer, a reinforcement layer and a rubber cover layer is provided for use in diesel fuel, biodiesel fuel, gasoline, crude oil, lubricating oil and synthetic oil applications.

In one embodiment, a hose is provided comprising a multiplicity of layers including an inner hydrogenated nitrile butadiene rubber (HNBR) tube layer; a reinforcement layer; and an outer rubber cover layer.

In another embodiment, a hose is provided comprising a multiplicity of layers including an inner hydrogenated nitrile butadiene rubber (HNBR) tube layer; a rubber backing layer; a reinforcement layer; and an outer rubber cover layer. In one aspect, the rubber backing layer is between the HNBR tube layer and the reinforcement layer.

In one embodiment, a hose is provided comprising a multiplicity of layers including an inner hydrogenated nitrile butadiene rubber (HNBR) tube layer, wherein the HNBR tube layer is prepared from a first composition comprising an HNBR polymer at 25-75 wt %.

In a further embodiment, a hose is provided comprising a multiplicity of layers including an inner hydrogenated nitrile butadiene rubber (HNBR) tube layer, wherein the HNBR tube layer is prepared from a first composition comprising an HNBR polymer having from 20%-50% acrylonitrile (ACN) content.

In another embodiment, a hose is provided comprising a multiplicity of layers including an inner hydrogenated nitrile butadiene rubber (HNBR) tube layer, wherein the HNBR tube layer is prepared from a first composition comprising an HNBR polymer having from 0-20% residual double bond (RDB) content In one embodiment, a hose is provided comprising a multiplicity of layers including an inner hydrogenated nitrile butadiene rubber (HNBR) tube layer, wherein the HNBR tube layer is prepared from the first composition comprising one or more fillers at 10-60 wt % compared to the total weight of the HNBR composition.

In one embodiment, a hose is provided comprising a multiplicity of layers including an inner hydrogenated nitrile butadiene rubber (HNBR) tube layer, wherein the one or more fillers is selected from the group consisting of silica; precipitated silica; carbon black; powdered carbon black; magnesium silicate; silicates, aluminum silicate, and titanium dioxide.

In one embodiment, a hose is provided comprising a multiplicity of layers including an inner hydrogenated nitrile butadiene rubber (HNBR) tube layer, wherein the HNBR tube layer is prepared from an HNBR tube composition comprising an HNBR polymer at 25-75 wt %, a filler at 10-50 wt %, a plasticizer at 1-10 wt %, an activator at 1-10 wt %, an antioxidant at 0.25-2 wt %, a coagent at 0.5-5 wt %, and a vulcanizing agent at 1-10 wt %.

In another embodiment, a hose is provided comprising a multiplicity of layers including an inner hydrogenated nitrile butadiene rubber (HNBR) tube layer, and a rubber backing layer, wherein the rubber backing layer is prepared from a second composition comprising a polymer selected from the group consisting of chlorinated polyethylene (CPE) polymer, EPDM polymer, and acrylonitrile butadiene rubber polymer (NBR). In some aspects, the second composition comprises a CPE polymer at 20-50 wt % and an EPDM polymer at 1-20 wt %.

In another embodiment, a hose is provided comprising a multiplicity of layers including an inner hydrogenated nitrile butadiene rubber (HNBR) tube layer, and a rubber backing layer, wherein the rubber backing layer is prepared from a second composition comprising a CPE polymer selected from a CPE polymer having from 30-40% chlorine.

In another embodiment, a hose is provided comprising a multiplicity of layers including an inner hydrogenated nitrile butadiene rubber (HNBR) tube layer; a rubber backing layer; a reinforcement layer; and an outer rubber cover layer, wherein the outer rubber cover layer is prepared from a third composition comprising a polymer selected from the group consisting of HNBR polymer, CPE polymer, EPDM polymer and NBR polymer. In some aspects, the third composition comprises a CPE polymer at 20-50 wt % and an EPDM polymer at 1-20 wt %.

In another embodiment, a hose is provided comprising a multiplicity of layers including a reinforcement layer, wherein the reinforcement layer is a discontinuous layer selected from the group consisting of polyester braid, aramid, nylon, cotton, and rayon. In some aspects, the hose comprises a single discontinuous reinforcement layer. In some aspects, the reinforcement layer is polyester braided reinforcement layer.

In one embodiment, a fuel hose is provided comprising the following layers in the hose's radial direction from the inside outwards: an HNBE tube layer; a CPE rubber backing layer; a reinforcement layer; and a CPE rubber cover layer.

In another embodiment, a method of making a hose is provided, comprising: extruding an HNBR composition over a mandrel to form an HNBR tube layer; wrapping a CPE polymer composition over the HNBR tube layer to form a CPE backing layer; braiding a polyester yarn over the CPE backing layer to form a polyester braided reinforcement layer; and extruding a CPE composition over the reinforcement layer to form a CPE rubber cover layer. In some aspects, the method for making a hose further comprises wrapping a nylon tape over the rubber cover layer; and vulcanizing the hose in an autoclave.

In another embodiment, a hose according to the disclosure exhibits an operating pressure of 28 bar (400 psi) determined by one or more of Proof (SAE J343), Burst (SAE J343), High Temp Burst (SAE J2045 at 115° C. and 150° C.), Leakage (SAE J343) and Impulse (SAE J343, at 400 psi and 150° C.) test protocols.

In a further embodiment, a hose prepared by the methods of the disclosure exhibits minimum burst pressure of 112 bar (1600 psi) when tested by SAE J343 at room temperature.

DETAILED DESCRIPTION OF THE PREFERRED EMBODIMENT

As used herein, the terms "a" or "an" are defined as singular or plural.

As used herein, the term "about" means within ten percent (10%) of the given value, either ten percent more than the given amount or ten percent less than the given amount, or both.

As used herein, the term "composition" refers to one or more of a compound, mixture, blend, alloy, polymer and/or copolymer.

As provide herein, ranges are intended to include, at least, the numbers defining the bounds of the range.

Unless otherwise specified, % values refer to weight %.

Figure 2:
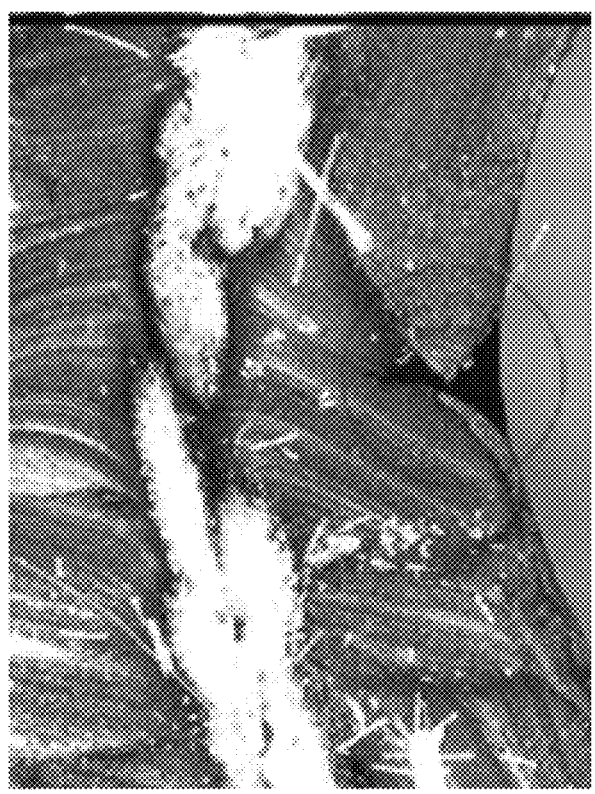
FIG. 2 shows a micrograph of a comparative hose without a rubber backing layer. Pin holes occur throughout the build and occur at gaps in the braided reinforcement layer, as shown within the grey circle.

Hydrogenated nitrile butadiene rubber (HNBR) is known for physical strength and retention of properties after long-term exposure to heat, oil, and chemicals with minimal degradation over long periods of time. HNBR is known to have excellent resistance to automotive fluids. However, HNBR polymers can be slow to cure, sometimes causing manufacturing problems including pin holes at reinforcement layer interstices of manufactured hoses. FIG. 2 shows a micrograph of a comparative hose without a rubber backing layer. Pin holes occur throughout the build and occur at gaps in the braided reinforcement layer, as shown within the grey circle.

A hose was developed utilizing an inner HNBR tube layer, a rubber backing layer, a reinforcement layer and a rubber cover layer in order to avoid common manufacturing problems including pin hole formation in the finished hose product.

A fuel hose comprising an inner HNBR tube layer, a reinforcement layer and a rubber cover layer is provided for use in diesel fuel, biodiesel fuel, gasoline, crude oil, lubricating oil and synthetic oil applications. In this configuration, no pin holes were evident in manufactured lots as evidenced by a photomicrograph shown at FIG. 3. The configuration of the hose allows for use of a single reinforcement layer to improve ease and cost of manufacture.

Figure 1:
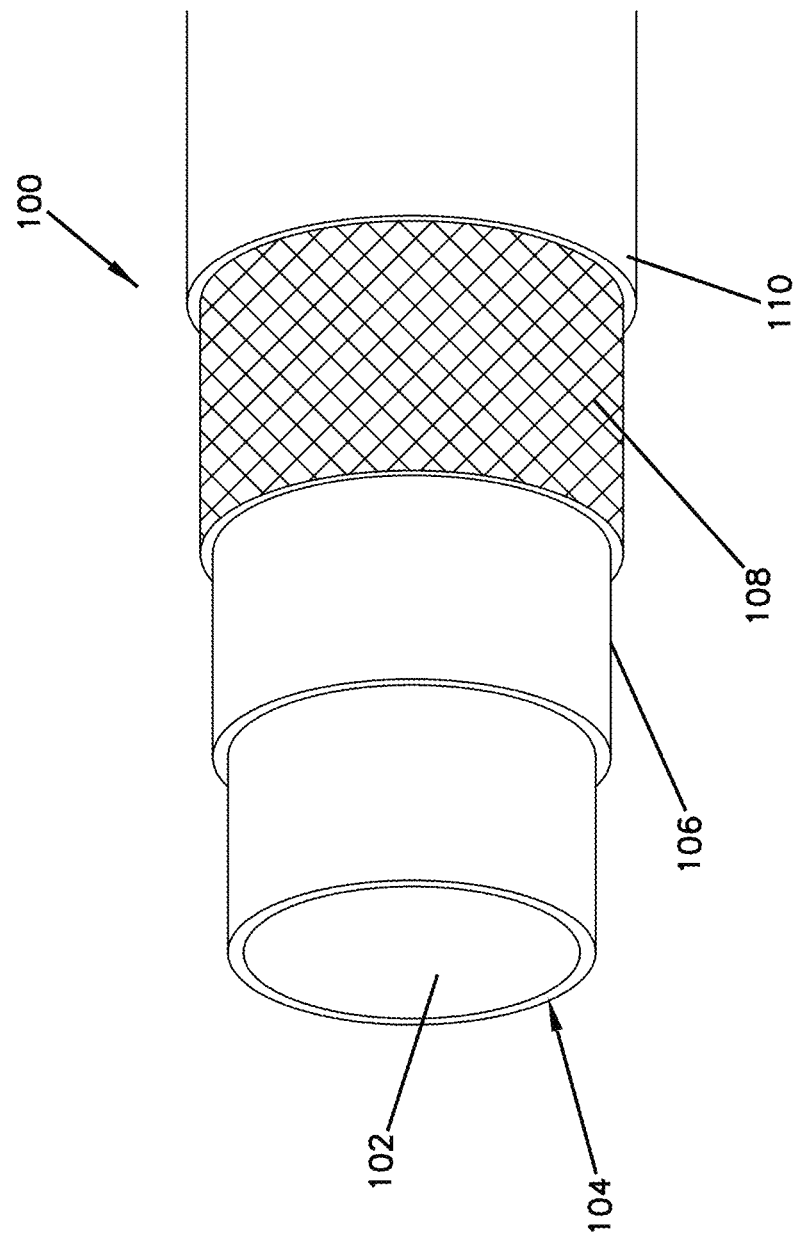
FIG. 1 shows one embodiment of a hose comprising an inner HNBR tube, a rubber backing layer, a braided reinforcement layer, and a rubber cover layer.

FIG. 1 shows one embodiment of a hose 100 according to the disclosure comprising a tubular portion 102, formed by an inner HNBR tube layer 104, a rubber backing layer 106, a reinforcement layer 108, and a rubber cover layer 110.

In some embodiments, a hose is provided comprising a multiplicity of layer including three or more layers comprising an inner HNBR tube layer, a single reinforcement layer, and an outside rubber cover layer. In some embodiments, the hose comprises from three to seven layers. In some embodiments, the hose comprises 3, 4, 5, 6, or 7 layers. In specific embodiments, the hose comprises less than 7, less than 6, or less than 5 layers. In specific embodiments, the hose comprises more than one, more than 2, or more than 3 layers.

In some embodiments, a hose is provided comprising three or more layers comprising an inner HNBR tube layer, a single reinforcement layer, and an outside rubber cover layer. In some embodiments, a hose is provided comprising four layers including an inner HNBR tube layer, a rubber backing layer, a single reinforcement layer, and a rubber cover layer. The hose is appropriate for transmitting liquids including diesel fuel, B20 biodiesel fuel, B100 biodiesel fuel, gasoline, crude and lubricating oil, and synthetic oils.

Figure 4A:
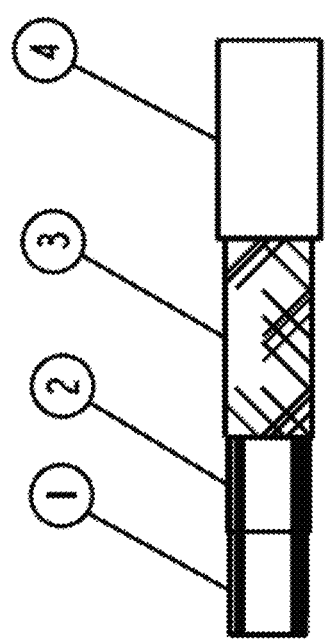
FIG. 4A shows a hose according to the disclosure comprising an inner HNBR tube layer 1, a rubber backing layer 2, a Polyester Braided reinforcement layer 3, and a rubber cover layer 4.

FIG. 4A shows one embodiment of a fuel hose according to the disclosure comprising a single reinforcement layer 3.

Figure 4B:
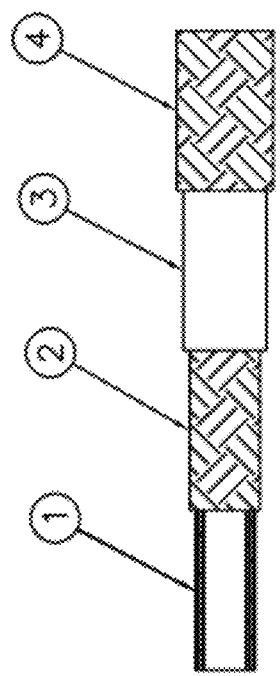
FIG. 4B shows a comparative hose comprising an inner HNBR tube layer 1, an Aramid reinforcement layer 2, a rubber insulation layer 3, and a Polyester Braided Cover Layer 4.

FIG. 4B shows a schematic of a Comparative fuel hose comprising two reinforcement layers—an Aramid reinforcement layer 2, and a Polyester Braided cover reinforcement layer.

HNBR Tube Layer

In some embodiments, a hose is provided comprising four layers, an inner HNBR tube layer, a rubber backing layer, a reinforcement layer and an outer rubber cover layer.

In some embodiments, the HNBR tube layer is prepared from an HNBR tube composition comprising hydrogenated nitrile butadiene rubber (HNBR) at from 25-75 wt %, 30-70 wt %, or 40-60 wt % of the HNBR tube composition. The HNBR composition comprises an HNBR having from 25-44%, 34-43%, or 34-36% acrylonitrile (ACN) content. Tradenames for HNBR polymers include THERBAN® (Lanxness) and ZETPOL® (Zeon Europe GmbH). In some embodiments, the HNBR layer is prepared from a composition comprising an HNBR polymer having 20%-50%, 25-45%, or 30-40% acrylonitrile (ACN) content. In some embodiments, the HNBR comprises from 0-20%, 0-10%, or not more than 6%, 4%, 20% or 0.9% residual double bond (RDB) content. In some embodiments, the HNBR comprises an Iodine Value (grams/100 grams) of 0-60, 3-30, 5-15, or not more than 7 g/100 g. In some embodiments, the HNBR layer comprises HNBR having a polymer Mooney viscosity ML(1+4) 100° C., of from 30-150, 30-60, or 60-110 MU by ASTM D 1646, unmassed sample. In a specific embodiment, the HNBR comprises 30-40% CAN, and maximum 0.9% RDB.

In some embodiments, an HNBR tube layer 104 is prepared from a HNBR composition that comprises one or more fillers. In some embodiments, the HNBR composition comprises one or more fillers at 10-60 wt %; 10-50 wt %; or 15-40 wt %. Examples of fillers used in some embodiments include, for instance: silica; precipitated silica; carbon black; powdered carbon black; magnesium silicate; silicates, aluminum silicate, titanium dioxide. In some embodiments, the HNBR layer is prepared from a first composition comprising 10-50% of a carbon black filler and 1-10 wt % precipitated silica.

In some embodiments, an HNBR tube layer 104 is prepared from a HNBR composition that comprises a plasticizer, selected from epoxidized octyl tallate, bis(2-butoxyethyl)adipate (DBEA), or tris(2-ethylhexyl) trimellitate (TOTM) at 0.5-20 wt %; 1-15 wt %; or 1-10 wt %. In some embodiments, the HNBR layer is prepared from a first composition comprising tris(2-ethylhexyl) trimellitate (TOTM) at 1-10 wt %.

In some embodiments, an HNBR tube layer 104 is prepared from a HNBR composition that comprises one or more activators selected from selected from magnesium oxide, zinc oxide, and stearic acid at a combined weight of 0.2-20 wt %, 0.5-15 wt %, or 1-10 wt %. In some embodiments, the NBR layer is prepared from a first composition comprising zinc oxide at 0.5-5 wt %, stearic oxide at 0.25-2 wt %, and magnesium oxide at 1-10 wt %.

In some embodiments, an HNBR tube layer 104 is prepared from a HNBR composition that comprises one or more antioxidants at a combined weight of 0.1-5 wt %, 0.2-3 wt % or 0.25-2 wt %. In some embodiments, antioxidants are selected from 2,2,4-trimethyl-1,2-dihydroquinolone, 6-ethoxyl,2-dihydro-2,2,4-trimethylquinoline, zinc 2-mercaptotolumimidazole, and diphenylamine antioxidants such as 4,4'-bis (alpha,alpha-dimethylbenzyl) diphenylamine.

In some embodiments, an HNBR tube layer 104 is prepared from a HNBR composition that comprises a coagent, for example triallyl isocyanurate (TAIC) at from 0.1-10 wt %, 0.5-5 wt %, or 1-4 wt %.

In some embodiments, an HNBR tube layer 104 is prepared from a HNBR composition that comprises a vulcanizing agent one or more vulcanizing agents at from 1-10 wt %, 2-8 wt % or 3-6 wt %. Vulcanizing agents can be selected from dicumyl peroxide, di-t-butyl peroxide, and t-butyl cumyl peroxide, and commercial products, such as Luperox™ DC40P-SP2 (dicumyl peroxide extended on calcium carbonate and silica, Arkema) or Varox® DCP-99 (bis(1-methyl-1-phenylethyl) peroxide, R.T. Vanderbilt).

In some embodiments, a hose is provided comprising a HNBR tube layer prepared from an HNBR tube composition comprising an HNBR polymer at 25-75 wt %, a filler at 10-50 wt %, a plasticizer at 1-10 wt %, an activator at 1-10 wt %, an antioxidant at 0.25-2 wt %, a coagent at 0.5-5 wt %, and a vulcanizing agent at 1-10 wt %.

In some embodiments, the inner diameter, ID, of the HNBR tube layer 104, the innermost layer, is 0.257"±0.015". In other embodiments, the inner diameter of the HNBR tube layer 104 is 0.280"±0.015". In still other embodiments, the inner diameter of the HNBR tube layer 104 is 0.366"±0.015". In yet other embodiments, the inner diameter of the HNBR tube layer 104 is 0.500"±0.015". In yet other embodiments, the inner diameter of the HNBR tube layer 104 is 0.633"±0.015".

In some embodiments, the thickness of the HNBR tube layer 104 is 0.065"±0.015".

Rubber Backing Layer

In some embodiments, the hose comprises four layers, an inner HNBR tube layer, a rubber backing layer, a reinforcement layer and an outer rubber cover layer. In some embodiments, the rubber backing layer 106 is prepared from a rubber backing composition comprising a polymer at from 10-60 wt¾, 20-50 wt¾, or 30-45 wt¾, wherein the polymer is selected from the group consisting of chlorinated polyethylene elastomer (CPE), EPDM, and nitrile rubber.

In some embodiments, the rubber backing layer 106 is prepared from a rubber backing composition comprising a chlorinated polyethylene polymer (CPE) at employed at 10-60 wt %; 20-50 wt %; or 30-45 wt %. In some aspects, the CPE polymer is selected from a 30-40% chlorine, or a 30%, 36% or a 40% chlorine CPE. CPE Tradenames include TYRIN® (Dow Chemical); and KELIREN® (Hangzhou Keli Chemical Company).

In some embodiments, the rubber backing layer 106 is prepared from a rubber backing composition comprising one or more ethylene-propylene-diene rubbers (EPDMs) in a range from about 1 wt % to about 20 wt %; 2 wt % to 15 wt %; or 4% to 10 wt % compared to the total weight of the filled rubber backing composition.

In some embodiments, the rubber backing layer 106 is prepared from a rubber backing composition comprising a nitrile rubber at 10-60 wt %; 20-50 wt %; or 30-45 wt %.

In some embodiments, the rubber backing layer 106 is prepared from a rubber backing composition comprising a curative at about 0.1 wt % to about 5 wt %; from about 0.25 wt % to about 3 wt %; or from about 0.25 wt % to about 2 wt % compared to the total weight of the filled rubber backing composition. In some embodiments, the curative is a phenylenedimaleimide such as N,N'-m-phenylenedimaleimide (CAS RN: 3006-93-7; N,N'-1,3-phenylene bismaleimide; HVA-2 curative, DuPont Chemical Co.).

In some embodiments, the rubber backing layer 106 is prepared from a rubber backing composition that comprises one or more fillers. In some embodiments rubber backing composition comprises one or more fillers at about 5% to about 60% wt %; 10-50 wt %; or 15-40 wt %. Examples of fillers used in some embodiments include, for instance: silica; carbon black; powdered carbon black; magnesium silicate; silicates, aluminum silicate, titanium dioxide.

In some embodiments, the rubber backing layer 106 is prepared from a composition comprising one or more activators selected from magnesium oxide, zinc oxide, and stearic acid, present at 1-10 wt %, 2-8 wt %, or 3-6 wt %.

In some embodiments, the rubber backing layer 106 is prepared from a rubber backing composition comprising one or more vulcanizing agents at from 1-10 wt %, 2-8 wt % or 3-6 wt %. Vulcanizing agents can be selected from dicumyl peroxide, di-t-butyl peroxide, and t-butyl cumyl peroxide, and commercial products, such as Luperox™ DC40P-SP2 (dicumyl peroxide extended on calcium carbonate and silica, Arkema) or Varox® DCP-99 (bis(1-methyl-1-phenylethyl) peroxide, R.T. Vanderbilt).

In some embodiments, the rubber backing layer 106 is prepared from a rubber backing composition comprising a resin such as an epoxy resin at 0.1-15 wt %; or 0.5-5 wt %.

In some embodiments, the rubber backing layer 106 is prepared from a rubber backing composition comprising a plasticizer, such as epoxidized octyl tallate, bis(2-butoxyethyl)adipate (DBEA), or tris(2-ethylhexyl) trimellitate (TOTM) at 1-25 wt %; 5-20 wt %; or 10-15 wt %.

In some embodiments, the rubber backing layer 106 is prepared from a rubber backing composition comprising a process aid such as a polyethylene wax, at 0.1-5 wt %; or 0.5-2 wt %.

In some embodiments, a hose is provided comprising a rubber backing layer 106 prepared from a compositions comprising a CPE polymer at 20-50 wt %, a filler at 1-20 wt %, a resin at 0.5-5 wt %, a plasticizer at 5-20 wt %, an activator at 1-10 wt %, a curative at 0.25-2 wt %, a process aid at 0.5-2 wt %, and a vulcanizing agent at 1-10 wt %.

In some embodiments, the thickness of the CPE backing layer 106 is 0.012"±0.005".

Reinforcement Layer

The fuel hose of the disclosure comprises a reinforcement layer 108, for example as shown in FIG. 1. The reinforcement layer 108 comprises a textile. Examples of suitable textiles for the reinforcement layer 108 include aramid, polyester braid, nylon, cotton, and rayon. In some embodiments, the reinforcement layer 108 is a discontinuous layer. In some embodiments, the reinforcement layer 108 is a discontinuous layer comprising a polyester braid, aramid, nylon, cotton, or rayon. In some embodiments, the rubber cover layer 110 and the rubber backing layer 106, migrate through the interstices of the textile in the reinforcement layer 108 and vulcanize together. In some embodiments, a hose is provided having a single reinforcement layer. In some embodiments, the hose does not comprise an Aramid reinforcement layer. In one embodiment, the reinforcement layer is a polyester braided reinforcement layer.

Rubber Cover Layer

In some embodiments, the rubber cover layer is prepared from a composition comprising a polymer selected from the group consisting of HNBR polymer, CPE polymer, EPDM polymer and NBR polymer. In some embodiments, the rubber cover layer is prepared from a CPE backing layer composition as described herein. In some embodiments, the rubber cover layer is prepared from an HNBR tube composition as described herein. In some embodiments, the rubber cover letter is prepared comprising a from a nitrile rubber. Nitrile rubber, also known as Buna-N, Perbunan, acrylonitrile butadiene rubber, and NBR, is a synthetic rubber copolymer of acrylonitrile (ACN) and butadiene. Trade names include NIPOL® NBR (Zeon Corporation), KRYNAC® NBR (Lanxness), PARACRIL® NBR (RHD Polymer & Chemical LLC), and EUROPRENE® NBR (Versalis eni).

In some embodiments, the rubber backing composition comprises one or more fillers selected from carbon black, silica, silicates, talc, aluminum silicate, calcium carbonate, magnesium oxide, zinc oxide, titanium dioxide and stearic acid. In some embodiments, the rubber backing composition comprises filler in an amount from about 30-60 wt %, 40-60 wt %, or 45-60 wt % compared to the total weight of the rubber backing composition.

In some embodiments, the thickness of the CPE rubber cover layer 106 is 0.033"±0.010".

Hose Applications.

A simplified scheme illustrating hose prepared according to the disclosure is shown in FIG. 4A. FIG. 4A shows an exemplary hose with an HNBR inner tube layer 1, an intermediate rubber backing layer 2, a single discontinuous polyester reinforcement layer 3, and an outer rubber cover layer 4. In one embodiment, no second reinforcement layer, or Aramid reinforcement layer, is required in the hose prepared according to the disclosure.

Configuration of a Comparative Hose is shown in FIG. 4B. The comparative hose of FIG. 4B comprises an HNBR inner tube 1, an Aramid reinforcement layer 2, a CPE Insulation layer 3 and an outer polyester braided cover 4.

EXAMPLES

Qualification Testing

Hose qualification testing is performed on hose prepared according to the invention using one or more of the following testing procedures as shown in Table 1A.

TABLE 1A

Hose Qualification Testing.

| Test | Standard | Notes |
|---|---|---|
| Proof | SAE J343 | |
| Elongation or Contraction | SAE J343 | |
| Burst | SAE J343 | |
| High Temperature Burst | SAE J2045 | Tested at 115° C. & 150° C., depending on fitting |
| Impulse Life Cycle Testing | SAE J343 | Tested at 400 psi & 150° C. |
| Assembly Tensile | SAE J2045 | Tested at room temperature & 115° C. |
| Vacuum Collapse | SAE J343 | |
| Cold Flex | SAE J343 | |
| Dry Heat Resistance | SAE J30 | Aged at 125° C. |
| Hot Oil Circulation | | |
| Oil Resistance | ASTM D380 | Automatic Transmission Fluid tested at 150° C., Mobil Delvac PS-164 Rev 7 oil |
| Biofuel Resistance | ASTM D380 | ASTM D6471 B20 tested at 150° C. ASTM D6471 B100 tested at 125° C. |
| Layer Adhesion | ASTM D413 | |

Hose Manufacturing Lot Testing is performed on manufactured hose according to one or more tests shown in Table 1B.

TABLE 1B

Hose Manufacturing Lot Testing.

| Test | Standard | Notes |
|---|---|---|
| Extended Proof Testing | SAE J343 | Pressure is 2.5 times the operating pressure and held for 60 sec |
| Elongation or Contraction | SAE J343 | |
| Leakage | SAE J343 | |
| Burst | SAE J343 | |
| Layer Adhesion | ASTM D413 | |

Example 1. HNBR Compositions

A hose comprising an HNBR layer was prepared as described below. The HNBR layer was prepared from a composition as shown in Table 2.

TABLE 2

Composition for HNBR Tube/Cover layer.

| Description | Component | Amount (wt %) |
|---|---|---|
| HNBR (34% ACN; RDB 0.9 max) | Polymer | 25%-75% |
| Carbon Black | Filler | 10%-50% |
| Precipitated Silica (Hi-Sil 532EP) | Filler | 1%-10% |

TABLE 2-continued

Composition for HNBR Tube/Cover layer.

| Description | Component | Amount (wt %) |
| --- | --- | --- |
| Tris (2-Ethylhexyl) Trimellitate (TOTM) | Plasticizer | 1%-10% |
| Zinc Oxide | Activator | 0.5%-5% |
| Stearic Acid | Activator | 0.25%-2% |
| Magnesium Oxide | Activator | 1%-10% |
| Diphenylamine antioxidant | Antioxidant | 0.25%-2% |
| Zinc 2-mercaptotolumimidazole | Antioxidant | 0.1%-1% |
| Triallyl isocyanurate (TAIC) | Coagent | 0.5%-5% |
| Organic Di-Cumyl Peroxide | Vulcanizing agent | 1%-10% |

Example 2. CPE Compositions

A hose comprising a CPE backing layer was prepared as described below. The CPE backing layer was prepared from a CPE backing layer composition as shown in Table 3. The CPE composition of Table 3 was also used to prepare a hose comprising a CPE cover layer.

TABLE 3

Composition for CPE Backing/Cover Layer.

| Material | Category | Amount (wt %) |
| --- | --- | --- |
| Chlorinated polyethylene, CPE (36% Cl) | Polymer | 20%-50% |
| EPDM | Polymer | 1%-20% |
| Carbon Black (N660) | Filler | 10%-50% |
| Epoxy Resin | Resin | 0.5%-5% |
| Epoxidized Octyl Tallate | Plasticizer | 5%-20% |
| Magnesium Oxide | Activator | 1%-10% |
| Polyethylene Wax | Process Aid | 0.5%-2% |
| N,N'-m- phenylene bismaleimide (HVA-2) | Curative | 0.25%-2% |
| Organic Di-Cumyl Peroxide | Vulcanizing agent | 1%-10% |

A Banbury™ mixer (Farrel Corporation) was used to mix the different rubber formulations according to ASTM D 3182-07.

Example 3. Manufacturing Process

In this example, a hose is manufactured by extruding HNBR prepared from the composition of Table 2 over a mandrel to form an extruded tube. The extruded tube is then wrapped with the CPE material prepared from the composition of Table 3, and then immediately braided over with the reinforcement. After braiding, the hose then has the rubber cover extruded over the top of the braid. From there a nylon tape is wrapped around the extruded cover and the hose is then cured in an autoclave. Nylon tape is removed after curing process is complete and hose is back to room temperature.

Inventive Hose was prepared from compositions described in examples 1 and 2, with construction and layer thickness as shown in Table 4, wherein the CPE cover layer was prepared from the composition of Table 3.

Figure 3:
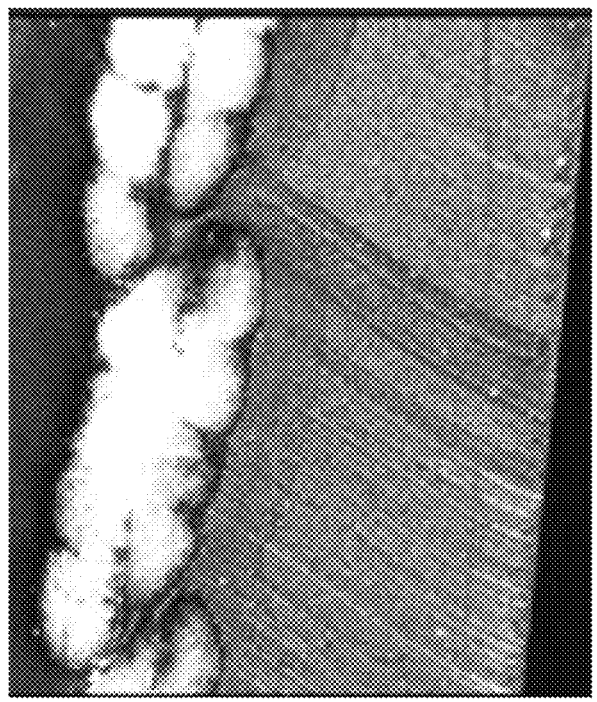
FIG. 3 shows a micrograph of a hose according to the disclosure where the rubber backing still flows at the reinforcement gaps but does not allow tube to flow as much and prevents formation of pin holes.

Hose prepared according to the disclosure did not exhibit pin holes upon manufacturing and testing the hose as shown in the photomicrograph of FIG. 3.

TABLE 4

Inventive Hose Construction.

| Layer | Description | Thickness (inches) |
| --- | --- | --- |
| 1 | HNBR Tube (extruded) | 0.065" |
| 2 | CPE Backing (wrapped) | 0.012" |
| 3 | Polyester Braided Reinforcement | N/A |
| 4 | CPE Cover (extruded) | 0.033" |

A construction of a Comparative Hose is shown in Table 5.

TABLE 5

Comparative Hose Construction.

| Layer | Description | Thickness (inches) |
| --- | --- | --- |
| 1 | HNBR Tube (extruded) | 0.065" |
| 2 | Aramid Reinforcement | N/A |
| 3 | CPE Insulation (wrapped) | 0.012" |
| 4 | Polyester Braided Cover | N/A |

Several hoses of sizes −4, −5, −6, −8 and −10 were prepared with nominal dimensions as shown in Table 6.

TABLE 6

Hose Nominal Dimensions.

| Size | ID (inches) | OD (inches) |
| --- | --- | --- |
| −4 | 0.257" | 0.545" |
| −5 | 0.280" | 0.553" |
| −6 | 0.366" | 0.654" |
| −8 | 0.500" | 0.805" |
| −10 | 0.633" | 0.935" |

Example 4. Hose with Rubber Cover Attributes

Hoses of sizes −4, −5, −6, −8 and −10 were prepared according to the disclosure and tested according to the protocols provided. Attributes of fuel hoses prepared according to Example 3 with an extruded HNBR inner tube layer, a wrapped CPE rubber backing layer, a polyester braided reinforcement layer and an extruded CPE cover layer are shown in Table 7. Hose was tested in Proof (SAE J343), Burst (SAE J343), High Temp Burst (SAE J2045 at 115° C. and 150° C.), Leakage (SAE J343) and Impulse (SAE J343, Tested at 400 psi & 150° C.) test protocols to determine the Operating Pressure as shown in Table 7.

TABLE 7

Hose with Rubber Cover Attributes.

| Hose Size | I.D. (REF) mm [in.] | O.D. (MAX) mm [in.] | OPERATING PRESSURE Bar [psi] | MIN. BURST PRESSURE Bar [psi] | MIN. BEND RADIUS mm [in] | WEIGHT kg/m [lbs/ft] |
|---|---|---|---|---|---|---|
| -4 | 6.4 [.25] | 14.5 [.57] | 28 [400] | 112 [1600] | 31.8 [1.25] | 0.14 [.09] |
| -5 | 7.1 [.28] | 14.7 [.58] | 28 [400] | 112 [1600] | 38.1 [1.50] | 0.14 [.09] |
| -6 | 9.4 [.37] | 17.2 [.68] | 28 [400] | 112 [1600] | 38.1 [1.50] | 0.18 [.12] |
| -8 | 12.7 [.50] | 21.0 [.83] | 28 [400] | 112 [1600] | 50.8 [2.00] | 0.25 [.17] |
| -10 | 16.0 [.63] | 24.6 [.97] | 28 [400] | 112 [1600] | 69.8 [2.75] | 0.28 [.19] |

Hose of example 4 exhibited an operating pressure of 28 bar (400 psi), and minimum burst pressure of 112 bar (1600 psi) when tested by SAE J343 at room temperature.

Figure 5:
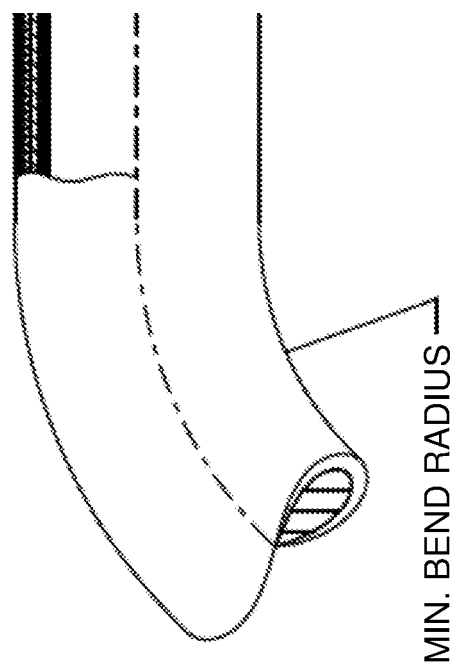
FIG. 5 shows a schematic illustrating minimum bend radius.

Minimum bend radius, as illustrated in FIG. 5, was determined for hose of size −4 as 31.8 mm (1.25 in), size −5 as 38.1 mm (1.5 in), size −6 as 31.8 mm (1.25 in), size −8 as 50.8 mm (2.0 in), and size −10 as 69.8 (2.75 in). Minimum bend radius is generally measured to the inside curvature, and is the minimum radius one can bend the hose without kinking, damaging, or shortening its life; the smaller the bend radius, the greater the material flexibility.

Temperature ranges were largely determined by material compatibility testing on slab rubber at 125° C. (B100, air) and 150° C. (B20 & oil). The hoses of sizes −4, −5, −6, −8 and −10 were further tested to determine operating temperature ranges for various applications. Impulse testing (SAE J343, 400 psi at 150° C.) was performed as additional validation. Resulting operating temperature ranges are shown in Table 8.

TABLE 8

Hose with Rubber Cover-Temperature Range in various Applications.

| Application | Temperature Range |
|---|---|
| Continuous for Oil, Diesel and B20 Biodiesel | −40° C. to 150° C. [−40° F. to 302° F.] |
| Intermittent for Oil | −40° C. to 175° C. [−40° F. to 347° F.] |
| Continuous for B100 Biodiesel | −40° C. to 125° C. [−40° F. to 257° F.] |
| For Air | −40° C. to 125° C. [−40° F. to 257° F.] |
| Continuous for All Composite Assemblies | −40° C. to 125° C. [−40° F. to 257° F.] |

The above specification, examples and data provide a complete description of the manufacture and use of the composition of the invention. Since many embodiments of the invention can be made without departing from the spirit and scope of the invention, the invention resides in the claims hereinafter appended.

We claim:

1. A hose comprising a multiplicity of layers including
an extruded inner hydrogenated nitrile butadiene rubber (HNBR) tube layer prepared from a first composition comprising an HNBR polymer at 25-75 wt %;
a wrapped rubber backing layer, prepared from a second composition comprising a chlorinated polyethylene (CPE) polymer at 30-45 wt % and an ethylene propylene diene rubber (EPDM polymer) at 1-20 wt %, having a thickness of 0.012"±0.005";
a reinforcement layer; and
an outer rubber cover layer,
wherein the rubber backing layer is disposed between the inner HNBR tube layer and the reinforcement layer.

2. The hose of claim 1, wherein the inner HNBR tube layer is prepared from a first composition comprising an HNBR polymer having 20%-50% acrylonitrile content.

3. The hose of claim 1, wherein the inner HNBR tube layer is prepared from a first composition comprising an HNBR polymer having from 0-20% residual double bond content.

4. The hose of claim 1, wherein the inner HNBR tube layer is prepared from the first composition comprising one or more fillers at 10-60 wt % compared to the total weight of the HNBR composition.

5. The hose of claim 4, wherein the one or more fillers is selected from the group consisting of silica, precipitated silica, carbon black, powdered carbon black, magnesium silicate, silicates, aluminum silicate, and titanium dioxide.

6. The hose of claim 1, wherein the inner HNBR tube layer prepared from an HNBR tube composition comprising
25-75 wt % of an HNBR polymer;
10-50 wt %, of a filler;
1-10 wt % of a plasticizer;
1-10 wt % of an activator;
0.25-2 wt % of an antioxidant;
0.5-5 wt % of a coagent; and
1-10 wt % of a vulcanizing agent.

7. The hose of claim 1, wherein the second composition comprises an EPDM polymer at 2-15 wt %.

8. The hose of claim 7, wherein the CPE polymer is a CPE polymer having from 30-40% chlorine.

9. The hose of claim 1, wherein the outer rubber cover layer is prepared from a third composition comprising a polymer selected from the group consisting of HNBR polymer, CPE polymer, EPDM polymer and NBR polymer.

10. The hose of claim 1, wherein the reinforcement layer is a discontinuous layer selected from the group consisting of polyester braid, aramid, nylon, cotton, and rayon.

11. The hose of claim 10, wherein the reinforcement layer is a single discontinuous reinforcement layer.

12. The hose of claim 11, wherein the reinforcement layer is polyester braided reinforcement layer.

13. The hose of claim 12, comprising the following layers in the hose's radial direction from the inside outwards:
a. the inner HNBR tube layer;
b. the rubber backing layer;
c. the reinforcement layer; and
d. the outer rubber cover layer.

14. The hose of claim 13, wherein the hose exhibits minimum burst pressure of 112 bar (1600 psi) when tested by SAE J343.

15. The hose of claim 13, wherein the operating pressure of the hose is 28 bar (400 psi) by one or more of Proof (SAE J343), Burst (SAE J343), High Temp Burst (SAE J2045 at 115° C. and 150° C.), Leakage (SAE J343) and Impulse (SAE J343, at 400 psi and 150° C.) test protocols.

16. The hose of claim 13, wherein the hose exhibits a continuous operating temperature range −40° C. to 150° C. for oil, diesel and B20 biodiesel.

17. A method of making the hose of claim 1, comprising:
   extruding an HNBR composition comprising an HNBR polymer at 25-75 wt % over a mandrel to form an inner HNBR tube layer;
   wrapping a CPE polymer composition comprising 30-45 wt % of a chlorinated polyethylene (CPE) polymer and 1-20 wt % of an EPDM polymer over the inner HNBR tube layer to form a CPE rubber backing layer;
   braiding a polyester yarn over the CPE rubber backing layer to form a polyester braided reinforcement layer; and
   extruding a CPE composition over the reinforcement layer to form a CPE rubber cover layer of the hose.

18. The method of making a hose according to claim 17, further comprising:
   wrapping a nylon tape over the CPE rubber cover layer of the hose; and
   vulcanizing the hose in an autoclave.

19. The method of claim 18, further comprising:
   cooling the vulcanized hose; and
   removing the nylon tape.

* * * * *